United States Patent
Kim et al.

(10) Patent No.: US 11,609,966 B2
(45) Date of Patent: Mar. 21, 2023

(54) DEVICE AND METHOD FOR MEASURING STREAM WATER DEPTH IN REAL-TIME THROUGH POSITIONING DATA FILTERING

(71) Applicants: HYDROSEM, Yongin-si (KR); REPUBLIC OF KOREA (NATIONAL DISASTER MANAGEMENT RESEARCH INSTITUTE), Ulsan (KR)

(72) Inventors: Seo Jun Kim, Yongin-si (KR); Byung Man Yoon, Yongin-si (KR); Ho Jun You, Yongin-si (KR); Dong Su Kim, Incheon (KR); Tae Sung Cheong, Seoul (KR); Jae Seung Joo, Ulsan (KR); Hyeon Seok Choi, Ulsan (KR)

(73) Assignees: HYDROSEM, Yongin-si (KR); REPUBLIC OF KOREA (NATIONAL DISASTER MANAGEMENT RESEARCH INSTITUTE), Ulsan (KR)

( * ) Notice: Subject to any disclaimer, the term of this patent is extended or adjusted under 35 U.S.C. 154(b) by 706 days.

(21) Appl. No.: 16/617,271

(22) PCT Filed: Nov. 29, 2018

(86) PCT No.: PCT/KR2018/014976
§ 371 (c)(1),
(2) Date: Nov. 26, 2019

(87) PCT Pub. No.: WO2020/101102
PCT Pub. Date: May 22, 2020

(65) Prior Publication Data
US 2021/0356584 A1    Nov. 18, 2021

(30) Foreign Application Priority Data
Nov. 13, 2018 (KR) .......................... 10-2018-0139068

(51) Int. Cl.
*G06F 11/30* (2006.01)
*G06F 17/00* (2019.01)
(Continued)

(52) U.S. Cl.
CPC .......... *G06F 17/00* (2013.01); *G01C 13/008* (2013.01); *G06F 17/18* (2013.01); *G01S 15/88* (2013.01)

(58) Field of Classification Search
CPC ........................................................ G06F 17/30
See application file for complete search history.

(56) References Cited

FOREIGN PATENT DOCUMENTS

| JP | 2001-081750 A | 3/2001 |
|---|---|---|
| KR | 10-1035617 B1 | 5/2011 |

(Continued)

OTHER PUBLICATIONS

Phonrattanasak et al., Real Time Presentation for Flooding Monitoring with Robust Lowess Calculation. In: Conference APCSEE 2014, Seoul, Korea, Jan. 2014 (Year: 2014).*
Barbosa, Nonlinear Sea level Trends from European Tide Gauge Records. Annales Geophysicae. Apr. 2004, vol. 22, pp. 1465-1472. (Year: 2004).*
International Search Report for PCT/KR2018/014976 dated Aug. 2, 2019 from Korean Intellectual Property Office.

(Continued)

*Primary Examiner* — Phuong Huynh
(74) *Attorney, Agent, or Firm* — Paratus Law Group, PLLC (57) ABSTRACT

Disclosed is a device and a method for measuring stream water depth in real-time through positioning data filtering to ensure the reliability of the measured water depth data even when the stream water depth measurement data is filtered and applied to a small stream having a small basin area and a steep slope. The device for measuring stream water depth in real-time through positioning data filtering includes: a measuring part for measuring the water depth of a stream to be measured; a positioning data filtering part for filtering the water depth data measured by the measuring means by a local linear regression-based bivariate scatterplot smoothing (Continued)

technique through elastic bandwidth application; and a water depth calculating part for calculating a water depth of the stream to be measured by using the positioning data filtered by the positioning data filtering part, and minimizing the uncertainty of the water depth measurement.

15 Claims, 7 Drawing Sheets

(51) Int. Cl.
*G01C 13/00* (2006.01)
*G06F 17/18* (2006.01)
*G01S 15/88* (2006.01)

(56) References Cited

FOREIGN PATENT DOCUMENTS

KR  10-1768150  *  8/2017
KR  10-1768150 B1  8/2017

OTHER PUBLICATIONS

Phonrattanasak et al., "Real time presentation for flooding monitoring with robust lowess calculation", ResearchGate, Jan. 2014, pp. 1-13.
Barbosa et al., "Nonlinear sea level trends from European tide gauge records", Annales Geophysicae, Apr. 8, 2004, pp. 1465-1472, vol. 22, No. 5.

* cited by examiner

DEVICE AND METHOD FOR MEASURING STREAM WATER DEPTH IN REAL-TIME THROUGH POSITIONING DATA FILTERING

CROSS-REFERENCE TO PRIOR APPLICATIONS

This application is a National Stage Patent Application of PCT International Patent Application No. PCT/KR2018/014976 (filed on Nov. 29, 2018) under 35 U.S.C. § 371, which claims priority to Korean Patent Application No. 10-2018-0139068 (filed on Nov. 13, 2018), which are all hereby incorporated by reference in their entirety.

BACKGROUND

The present invention relates to stream water depth measurement, and more particularly, to a device and a method for measuring a stream water depth in real time using positioning data filtering which filters measured stream water depth data to ensure the reliability of the measured water depth data even when the measured stream water depth data is applied to a small stream having a small basin area and a steep slope.

Currently, in Korea, although 22,823 small streams are distributed throughout the country, the number of local government officials who can manage the streams is absolutely insufficient.

For this reason, only national streams managed by the central government have been measured so far. Due to an improved quality of life, demands for reducing flood damage of small streams in local communities are increasing such that there is a need for automated measurement technology in which streams may be measured with less manpower.

There are many types of hydraulic and hydrology data needed to manage streams. Among them, rainfall data for stream basins, and water depth data and discharge data of the streams are the most important data.

The rainfall data for stream basins is continuously and automatically measured by various rain gauges and, currently, is appropriately being measured in terms of the frequency or accuracy of measurement data.

On the other hand, due to the difficulty of measurement of the water depth data and the discharge data of the stream, the water depth and discharge measurements are much less frequent and accurate than the rainfall measurement.

In particular, the discharge measurement is very difficult. There are several observations stations using horizontal acoustic Doppler current profilers (H-ADCPs) to automate measurements but not all discharge are measured and thus a large part of measurement data needs to be corrected.

Currently, in Korea, a method in which a water depth is measured and the measured water depth is converted into a discharge by applying a water depth-discharge curve prepared in advance is mainly adopted (Hydrological Survey Center, 2014).

On the other hand, the water depth measurement is relatively easily and consecutively carried out because it is easier to automate than the discharge measurement.

In Korea, the water depth measurement is usually carried out by a float water-depth meter, a pressure water-depth meter, an ultrasonic water-depth meter, or the like.

An ultrasonic water-depth measurement device outputs ultrasonic waves in a direction of a water surface to be measured, detects the ultrasonic waves reflected by a water surface, and then calculates a height of the water surface using the reflected ultrasonic waves.

Figure 1A:
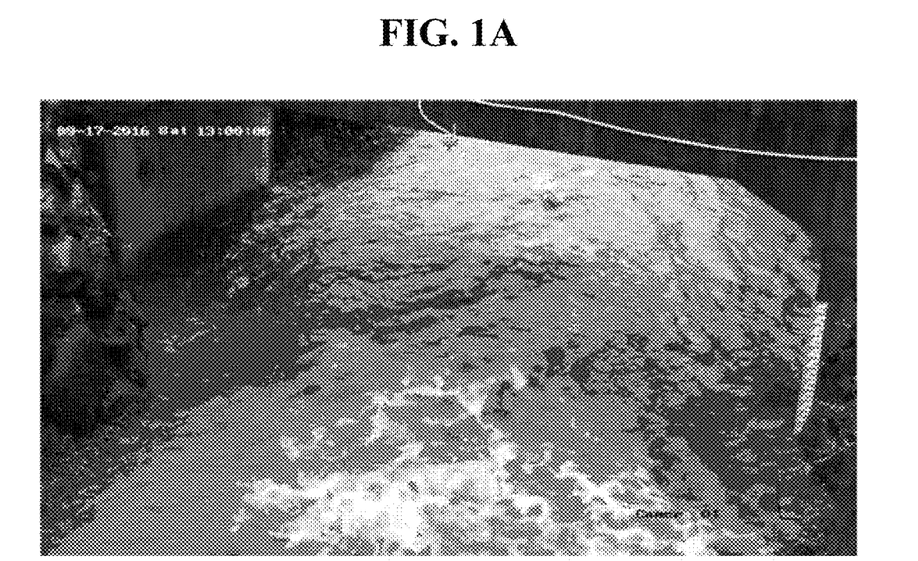
FIG. 1A is a photograph showing a state of a rough water surface of a small stream during flooding.
Figure 1B:
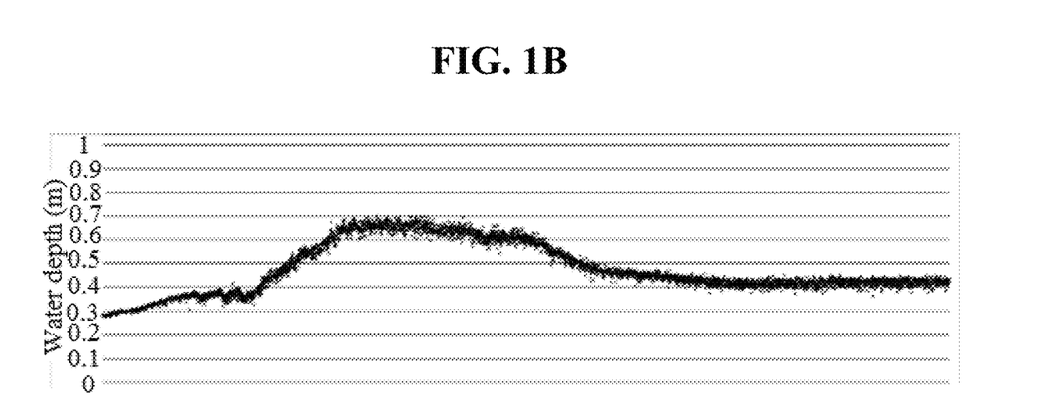
FIG. 1B is a graph of a result of measuring a water depth of a small stream during flooding.

FIG. 1A is a photograph showing a state of a rough water surface of a small stream during flooding, and FIG. 1B is a graph of a result of measuring a water depth of a small stream during flooding.

In the case of large national and local streams, water depth measurement results may be presented as one curve because a change in water depth of a stream is relatively gradually increased according to passage of time during flooding.

However, in the case of small streams, the outflow occurs rapidly during flooding and slopes of most of the streams are steep, and thus the water surfaces of the streams are very rough. For this reason, even with a water depth measurement sensor having good performance, there is a limitation that the results of the water depth measurement in the small streams during flooding are very irregular.

Therefore, the accuracy of the water depth measurement results in the small streams during flooding is very poor and directly affects the reliability of a small stream discharge measurement and flood forecasting system using the water depth measurement results, and thus there is a need for a filtering technique for quality control of water depth measurement results in small streams during flooding.

In particular, since it is necessary to provide high-quality water depth data in real time to local government officials and persons concerned who respond urgently to emergency disasters during flooding by utilizing measured real-time small stream water depth data, there is a need for a technique that can increase the reliability of real-time water depth measurement results.

SUMMARY

The present invention is directed to solving the problems of the stream water depth measurement technique in the related art and is directed to providing a device and a method for measuring a stream water depth in real time using positioning data filtering, which filters positioning data of a water depth measuring unit using a local linear regression-based bivariate scatterplot smoothing technique through adaptive bandwidth application so that water depth information with increased accuracy is provided in real time.

The present invention is directed to providing a device and a method for measuring a stream water depth in real time using positioning data filtering which measures a water depth of a measurement target at various positions and measures an accurate water depth regardless of a structure installed on the measurement target so that the performance of the water depth measurement is improved.

The present invention is directed to providing a device and a method for measuring a stream water depth in real time using positioning data filtering, which filters measured stream water depth data to ensure the reliability of the measured water depth data even when the measured stream water depth data is applied to a small stream having a small basin area and a steep slope so that the measured stream water depth data is effectively used for discharge calculation.

The present invention is directed to providing a device and a method for measuring a stream water depth in real time using positioning data filtering, which filters measured stream water depth data and transmits water depth information with high reliability, of the measured water depth data in a wireless manner so that the water depth information is stored or managed in real time.

The present invention is directed to providing a device and a method for measuring a stream water depth in real time using positioning data filtering, which includes a stream water depth measurement device based on Arduino using an open source based single board microcontroller so that development and application environments are improved.

The present invention is directed to providing a device and a method for measuring a stream water depth in real time using positioning data filtering, which stores calculated water depth information in a database using a Web service of a Web server and provides the corresponding result through a Web page of the Web server so that the efficiency of stream management is increased.

The scope of the present invention is not limited to the above-described objects, and other unmentioned objects may be clearly understood by those skilled in the art from the following descriptions.

One aspect of the present invention provides a real-time stream water depth measurement device using positioning data filtering, which includes a measuring unit configured to measure a water depth of a stream to be measured, a positioning data filtering unit configured to filter water depth data measured by the measuring unit using a local linear regression-based bivariate scatterplot smoothing technique through adaptive bandwidth application, and a water depth calculating unit configured to calculate the water depth of the stream to be measured using the positioning data which is filtered by the positioning data filtering unit and in which uncertainty of the water depth measurement is minimized.

Here, the measuring unit may be an ultrasonic sensor which transmits ultrasonic waves to a surface of a measurement target, receives reflected waves formed by the transmitted ultrasonic waves being reflected from the surface of the measurement target and being returned, and measures a distance from the surface of the measurement target on the basis of a time difference between an ultrasonic transmission time and a reflected wave reception time, an ultrasonic transmission velocity, and a reflection velocity of the reflected wave.

Another aspect of the present invention provides a real-time stream water depth measurement device using positioning data filtering, which includes: a Global Positioning System (GPS) reception unit configured to receive GPS information according to an installation position of the stream water depth measurement device from a GPS satellite; an ultrasonic sensor unit configured to transmit ultrasonic waves to a surface of a measurement target, receive reflected waves formed by the transmitted ultrasonic waves being reflected from the surface of the measurement target and being returned, and measure a distance from the surface of the measurement target on the basis of a time difference between an ultrasonic transmission time and a reflected wave reception time, an ultrasonic transmission velocity, and a reflection velocity of the reflected wave; a positioning data filtering unit configured to filter the positioning data of the ultrasonic sensor unit and minimize uncertainty of the water depth measurement due to rough water surface ripples of a small stream; and a water depth calculating unit configured to calculate a water depth, which is a distance from a bottom of the measurement target to the water surface of the measurement target, using altitude information included in the GPS information received from the GPS reception unit, distance information filtered by the positioning data filtering unit and measured by the ultrasonic sensor unit, and distance information between a structure and the bottom of the measurement target.

Here, the real-time stream water depth measurement device may further include a communication unit configured to transmit the water depth information calculated by the water depth calculating unit to a stream information management server that comprehensively manages stream information.

The GPS information received by the GPS reception unit may include position information composed of latitude and longitude coordinates values, altitude information representing an altitude, and time information composed of date and time, and the GPS reception unit may receive position information about a position at which the stream water depth measurement device is installed and provide the position information about the corresponding position when the water depth information of the measurement target is provided at the corresponding position.

The positioning data filtering unit may include a smoothed value estimating unit configured to estimate a smoothed value at an arbitrary position in the measured positioning data, a smoothed most probable value calculating unit configured to calculate a plurality of smoothed most probable values for an initial fixed bandwidth such that a square of an estimated error is minimalized, a cross-validated residual calculating unit configured to calculate a cross-validated residual for each bandwidth, an optimal bandwidth calculating unit configured to calculate an optimal bandwidth for each point, a bandwidth selecting unit configured to select a bandwidth close to an optimal bandwidth from among initially input bandwidths, and a final smoothed most probable value calculating unit configured to calculate a final smoothed most probable value by linear interpolation using the smoothed most probable value.

The real-time stream water depth measurement device may further include a Web server configured to receive the water depth information calculated by the water depth calculating unit through wired and/or wireless communication, store the calculated water depth information in a database using a Web service, and provide the corresponding result through a Web page.

Still another aspect of the present invention provides a real-time stream water depth measurement method using positioning data filtering, which includes: transmitting ultrasonic waves to a surface of a measurement target and receiving reflected waves formed by the transmitted ultrasonic waves being reflected from the surface of the measurement target and returned; estimating a smoothed value at an arbitrary position to filter the positioning data received by the ultrasonic sensor, calculating a plurality of smoothed most probable values for an initial fixed bandwidth such that a square of an estimated error is minimum, and calculating a cross-validated residual for each bandwidth; calculating an optimal bandwidth for each point and selecting a bandwidth close to the optimal bandwidth from among initially input bandwidths; calculating a final smoothed most probable value by linear interpolation using the smoothed most probable value; and calculating a distance from the surface of the measurement target using the filtered positioning data on the basis of a time difference between an ultrasonic transmission time and a reflected wave reception time, an ultrasonic transmission velocity, and a reflection velocity of the reflected wave and calculating a water depth.

A device and a method for measuring a stream water depth in real time using positioning data filtering according to the present invention have the following effects.

First, measured stream water depth data can be filtered to ensure the reliability of the measured water depth data even when the measured stream water depth data is applied to a small stream having a small basin area and a steep slope, and thus the measured stream water depth data can be effectively used for discharge calculation or the like.

Second, positioning data of a water depth measuring unit can be filtered using a local linear regression-based bivariate scatterplot smoothing technique through adaptive bandwidth application so that water depth information with increased accuracy can be provided in real time.

Third, a water depth of a measurement target can be measured at various positions and an accurate water depth can be measured regardless of a structure installed on the measurement target so that the performance of the water depth measurement can be improved.

Fourth, measured stream water depth data can be filtered and water depth information with high reliability of the measured water depth data can be transmitted in a wireless manner so that the water depth information can be stored or managed in real time.

Fifth, a stream water depth measurement device based on Arduino using an open source based single board microcontroller can be configured so that development and application environments can be improved.

Sixth, calculated water depth information can be stored in a database using a Web service of a Web server and the corresponding result can be provided through a Web page of the Web server so that the efficiency of stream management can be increased.

DETAILED DESCRIPTION

Hereinafter, exemplary embodiments of a device and a method for measuring a stream water depth in real time using positioning data filtering according to the present invention will be described in detail as follows.

Features and advantages of the device and the method for measuring the stream water depth in real time using positioning data filtering according to the present invention will become clear from the detailed description of each embodiment below.

Figure 2:
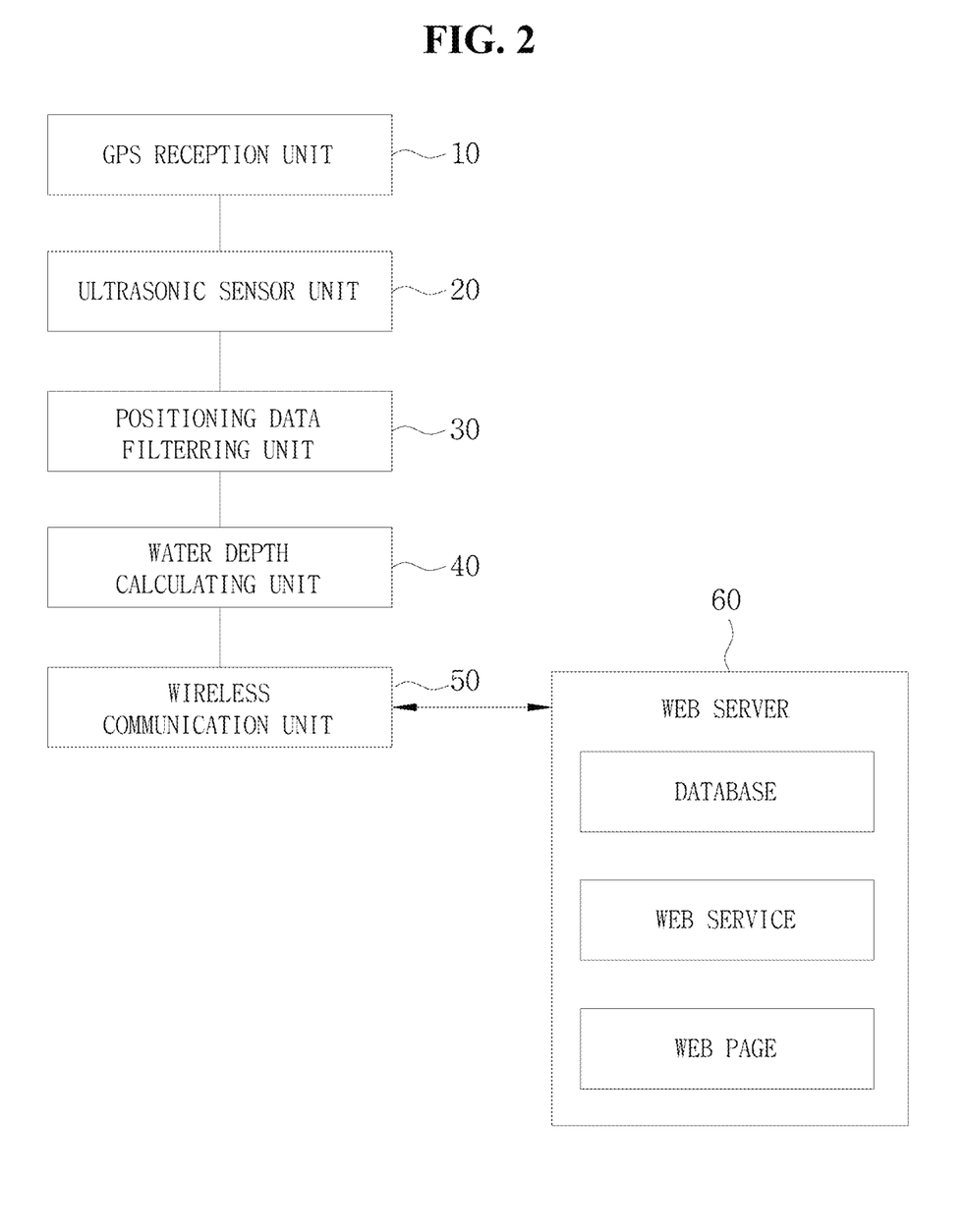
FIG. 2 is a configuration diagram of a real-time stream water depth measurement device using positioning data filtering according to an embodiment of the present invention.

FIG. 2 is a configuration diagram of a real-time stream water depth measurement device using positioning data filtering according to an embodiment of the present invention.

Figure 3A:
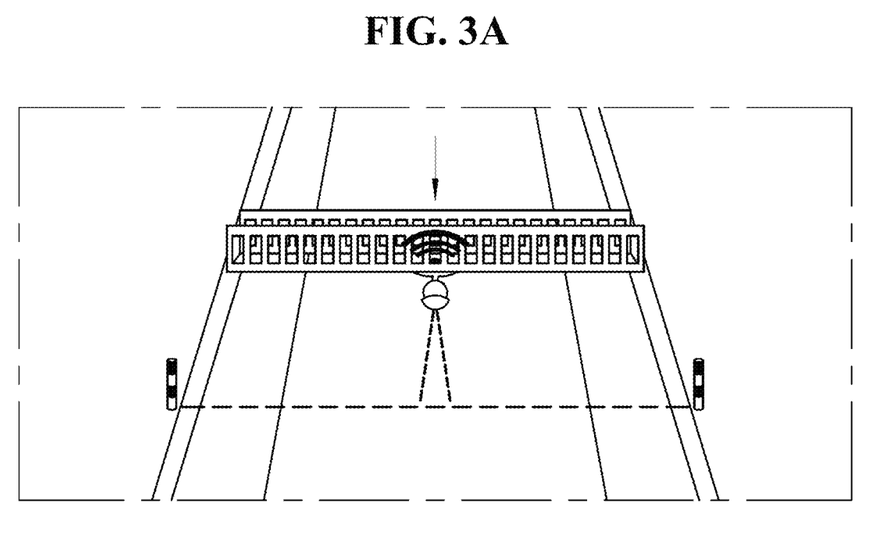
FIG. 3A is a configuration diagram illustrating an example of a position at which a stream water depth measurement device is installed.
Figure 3B:
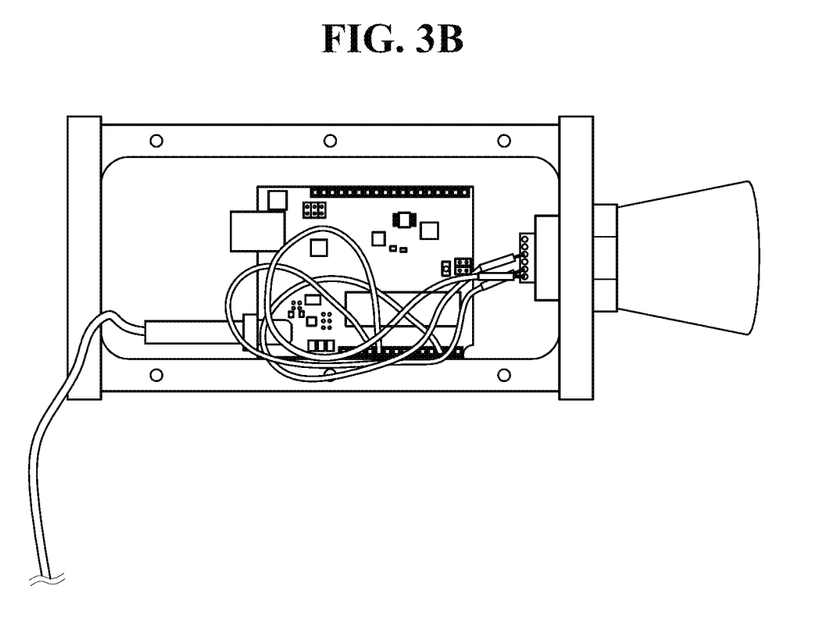
FIG. 3B is a configuration diagram of an ultrasonic water depth measurement device based on Arduino according to an embodiment of the present invention.

FIG. 3A is a configuration diagram illustrating an example of a position at which a stream water depth measurement device is installed, and FIG. 3B is a configuration diagram of an ultrasonic water depth measurement device based on Arduino according to an embodiment of the present invention.

In the following description, a stream water depth measurement device using an ultrasonic sensor is described as an example of a stream water depth measuring unit to which the present invention is applied, but the present invention is not limited thereto, and the present invention may also be applied to a stream water depth measurement device using spatiotemporal image analysis or a combination thereof.

In addition, a positioning data filtering unit according to the present invention is described as being included in the stream water depth measurement device, but the present invention is not limited thereto, and a location at which the positioning data filtering unit is installed may be included in a stream information management server that comprehensively manages stream information.

In addition, the present invention includes an algorithm for filtering water depth data of a small stream during flooding which is measured using the stream water depth measurement device and includes a water depth data correction algorithm for minimizing uncertainty of water depth measurement due to rough water surface ripples.

In particular, the measured water depth data may be transmitted to a system controller and a server PC in a wired or wireless manner to be utilized as input data of an automatic discharge measurement program, and the measured water depth data may be checked in real time by a real-time water depth and discharge display Web service.

In addition, a stream water depth measurement device based on Arduino using an open source based single board microcontroller may be included so that development and application environments may be improved.

The device and the method for measuring the stream water depth in real time using positioning data filtering according to the present invention include a positioning data filtering unit for increasing the accuracy by filtering the positioning data received from the water depth measuring unit using a local linear regression-based bivariate scatterplot smoothing technique through adaptive bandwidth application.

The real-time stream water depth measurement device using positioning data filtering according to the embodiment of the present invention includes a Global Positioning System (GPS) reception unit 10 which receives GPS information according to an installation position of the stream water depth measurement device from a GPS satellite, an ultrasonic sensor unit 20 which transmits ultrasonic waves to a surface of a measurement target, receives reflected waves formed by the transmitted ultrasonic waves being reflected from the surface of the measurement target and being returned, and measures a distance from the surface of the measurement target on the basis of a time difference between an ultrasonic transmission time and a reflected wave reception time, an ultrasonic transmission velocity, a reflection velocity of the reflected wave, and the like, a positioning data filtering unit 30 which filters the positioning data of the ultrasonic sensor unit 20 to minimize the uncertainty of the water depth measurement due to the rough water surface ripples of the small stream, a water depth calculating unit 40 which calculates a water depth, which is a distance from a bottom of the measurement target to the water surface of the measurement target, using altitude information included in the GPS information received from the GPS reception unit 10, distance information filtered by the positioning data filtering unit 30 and measured by the ultrasonic sensor unit 20, and distance information between a structure and the bottom of the measurement target, a wireless communication unit 50 which enables wireless communication with an external communication device to transmit the water depth information of the measurement target calculated by the water depth calculating unit 40 and the GPS information according to the measurement position received by the GPS reception unit 10 to the external communication device in a wireless manner, and a Web server 60 which receives the calculated water depth information through the wireless communication unit 50, stores the calculated water depth information in a database using a Web service, and provides the corresponding result through a Web page, as illustrated in FIG. 2.

Here, the GPS reception unit 10 receives position information about a position at which the stream water depth measurement device is installed and provides the position information about the corresponding position when the water depth information of the measurement target is provided at the corresponding position.

The GPS information includes all of position information composed of latitude and longitude coordinates values, altitude information representing an altitude, time information composed of date and time, and the like.

The Web service of the Web server 60 includes an application programming interface (API) that can retrieve and provide the water depth information.

The distance information between the structure and the bottom of the measurement target may be replaced with any information that can calculate the water depth of the measurement target when only the altitude information received from the GPS reception unit 10 and the distance information measured by the ultrasonic sensor unit 20 are present.

The wireless communication unit 50 may transmit the water depth information of the measurement target and the GPS information corresponding to the water depth information to an external communication device such as a laptop computer, a smart phone, or a tablet PC using Wi-Fi communication, mobile communication, near field communication, or wireless Internet communication so as to separately store or analyze the water depth information.

The external communication device may be a stream information management server that comprehensively manages the stream information and may use wired communication to increase stability rather than wireless communication.

The real-time stream water depth measurement device using positioning data filtering according to the present invention is installed in the middle of a bridge of the stream, as illustrated in FIG. 3A, and may be installed to transmit data by connecting continuous power and the Internet.

A measurement range of the ultrasonic water depth sensor of the ultrasonic sensor unit 20 may be 5 m or more in consideration of a height from the bridge to the stream bed, a minimum measurement time interval may be less than 10 seconds, and the resolution may be less than 1 mm.

The stream water depth measurement device installed as described above may include a stream water depth measurement device based on Arduino using an open source based single board microcontroller, as illustrated in FIG. 3B, so that the development and application environments may be improved.

In addition, the real-time stream water depth measurement device using positioning data filtering according to the present invention should operate stably even under sudden heavy rains and thus should have a structure that is highly waterproof and dustproof.

In particular, the stream water depth measurement device should be durable such that it can be operated for real-time small stream measurement without interruption and may be firmly installed to ensure normal operation even under extreme conditions such as lightning, typhoon, or heavy rain and thus all devices or facilities may be arranged for maximum performance to minimize obstacles.

The detailed configuration of the positioning data filtering unit according to the present invention will be described as follows.

Figure 4:
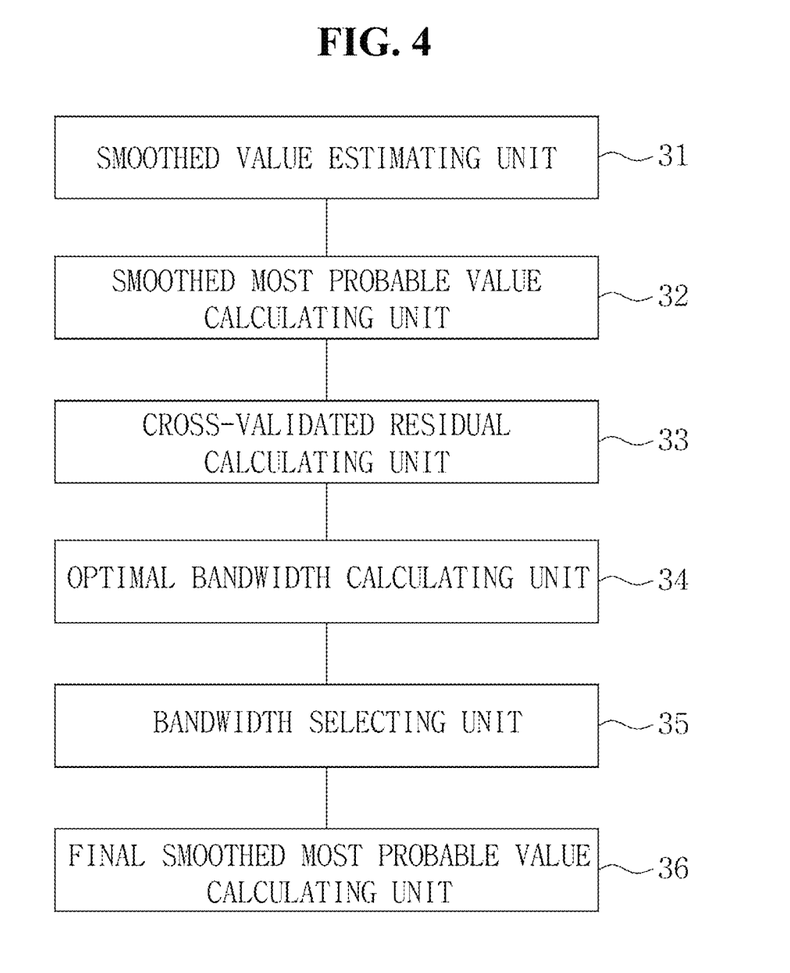
FIG. 4 is a detailed configuration diagram of a positioning data filtering unit according to the present invention.

FIG. 4 is a detailed configuration diagram of the positioning data filtering unit according to the present invention.

The positioning data filtering unit 30 according to the present invention includes a smoothed value estimating unit 31 which estimates a smoothed value at an arbitrary position in the positioning data received by the ultrasonic sensor, a smoothed most probable value calculating unit 32 which calculates a plurality of smoothed most probable values for an initial fixed bandwidth such that a square of the estimated error is minimum, a cross-validated residual calculating unit 33 which calculates a cross-validated residual for each bandwidth, an optimal bandwidth calculating unit 34 which calculates an optimal bandwidth for each point, a bandwidth selecting unit 35 which selects a bandwidth close to the optimal bandwidth among initially input bandwidths, and a final smoothed most probable value calculating unit 36 which calculates a final smoothed most probable value by linear interpolation using the smoothed most probable value.

The positioning data filtering according to the present invention will be described in detail as follows.

Generally, a large amount of measurement data measured and inspected is represented as scatterplots with (x, y) type bivariate parameters, and the qualitative trends are analyzed by deriving mathematical stroke lines through linear or nonlinear regression.

However, it is often impossible to derive quantitative mathematical stroke lines due to a lack of correlation between a large amount of time series measurement data or parameters outside a local domain.

In this case, smoothing techniques have been mainly applied in which the fluctuations caused by random behavior are removed, local trends are reflected, and then overall strokes are derived.

These techniques may basically use a least-squares method to estimate a most probable value on the basis of surrounding local data (local linear regression) and then link the estimated value to smooth scatterplots and track trends (scatterplot smoothing).

As a representative scattering smoothing technique, there is locally weighted scatterplot smoothing (LOWESS) or locally estimated scatterplot smoothing (LOESS), which uses locally divided data based on a fixed bandwidth (or window).

In the present invention, in order to improve the reliability of positioning data filtering, an adaptive bandwidth is calculated by reflecting the characteristics of the local data, thereby improving accuracy and processing efficiency, which is a disadvantage of the LOWESS.

Figure 5:
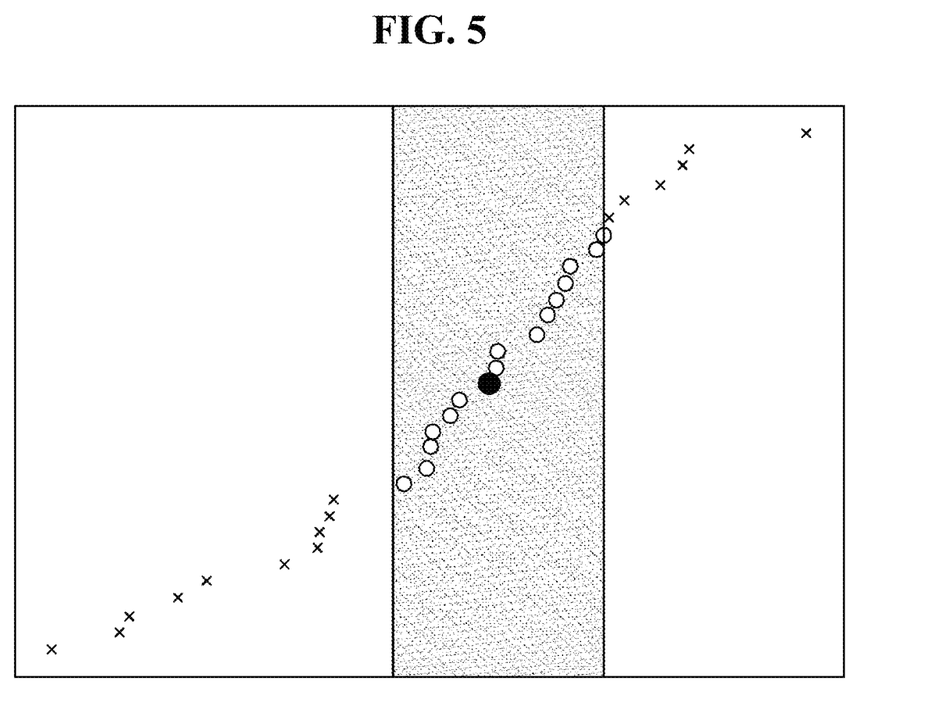
FIG. 5 is a configuration diagram of bandwidth setting when positioning data is filtered according to the present invention.

FIG. 5 is a configuration diagram of bandwidth setting when positioning data is filtered according to the present invention.

The positioning data filtering unit 30 of the present invention divides bivariate data into adaptive bandwidths and calculates most probable values by applying weighted linear regression in each section.

The positioning data filtering unit 30 estimates the most probable values by repeating the same task at all x positions or given spans and connects the x positions to obtain a smoothed stroke curve.

The basis of scatterplot smoothing is the bandwidth width setting and the weighted least-squares method.

As illustrated in FIG. 5, the bandwidth refers to a region for designating only a part of the scatterplot, a certain range (width) of data is selected and used for calculation based on a value of an x parameter of one object, and another bandwidth is set based on a value of an x parameter of a next object.

That is, the bandwidth is used as a means for estimating a local pattern.

Figure 6:
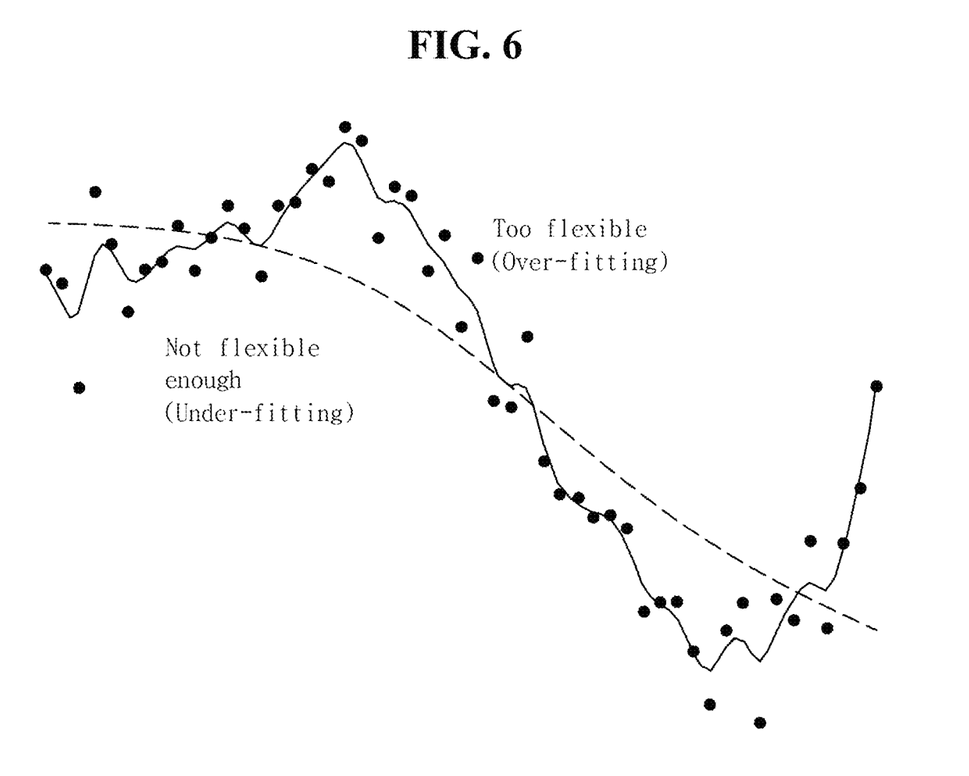
FIG. 6 is a graph showing a difference between results of smoothing application according to a bandwidth.

FIG. 6 is a graph showing a difference between results of smoothing application according to a bandwidth.

In the case of the LOWESS method, a bandwidth represented by a size of a fixed bandwidth is used as a number between ⅓ and ⅔ of all data at a corresponding position.

In this case, as illustrated in FIG. 6, when the bandwidth is too large, a regression function appears as a flat curve similar to a straight line (under-fitting), and when the bandwidth is small, the regression function appears as a curve having a large degree of bending (over-fitting).

Therefore, it is important to specify the appropriate bandwidth for the purpose of use.

A filtering algorithm applied to the positioning data filtering unit 30 according to the present invention will be described in detail as follows.

First, in the smoothed value estimating unit 31, $\hat{f}(x_i)$ which is a smoothed value (or a most probable value) at an arbitrary position $x_i$ in scatterplots is estimated by local regression using a least-squares method as follows.

$$\hat{E}[Y|x_i] = \hat{\alpha} + \hat{\beta}x_j, x_j \in N_i \qquad \text{[Equation 1]}$$

Here, N denotes a local bandwidth around $x_i$ and is optimized for each position.

When a specific bandwidth J is given and the number of parameters in the bandwidth is N, a local linear regression tracker is obtained by Equation 2 below.

$$\hat{y}_k = \hat{\alpha} + \hat{\beta}x_k, k=1, \ldots, N \qquad \text{[Equation 2]}$$

Here, $\hat{\alpha}$ and $\hat{\beta}$ may be obtained by linear regression of local data which is present in $i_{-J/2}, \ldots, i_{+J/2}$, and $\hat{y}_i$ becomes a smoothed most probable value corresponding to the position of $x_i$.

The bandwidth J is not fixed and an additional task proceeds as follows.

In order to calculate a smoothed most probable value that is linked to a locally adaptive bandwidth, in a filtering algorithm (Friedman's Super Smoother) according to the present invention, when an observation value of y=f(x) and a bandwidth of J(x) are given at the x position, a basic principle is to calculate J(x) and f(x) such that a square of an estimation error is minimized, as shown in Equation 3.

$$e^2(f,J) = E[Y - f(X|J(x))]^2 \qquad \text{[Equation 3]}$$

In order to minimize Equation 3 in the smoothed most probable value calculating unit 32, when the number of pieces of whole data is n, a plurality of smoothed most probable values f(x) are calculated by applying Equation 2 to initial fixed bandwidths J, of various sizes between 0<j<n, and a cross-validated residual is calculated for each bandwidth, J, by the cross-validated residual calculating unit 33 as follows.

$$r_{(i)(J)} = [y_i - \hat{f}(x_i|J)] \Big/ \left(1 - \frac{1}{J} - \frac{(x_i - \bar{x}_J)^2}{V_J}\right) \qquad \text{[Equation 4]}$$

In this case, equations, $$V_J = \frac{1}{n}\sum_{j=i-J/2}^{i+J/2}(x_i - \bar{x}_J)^2, \bar{x}_J = \frac{1}{J}\sum_{j=i-J/2}^{i+J/2}x_i,$$

are satisfied.

Equation 5 below is used to derive $\hat{e}(f,J|x_i)$ as a result of smoothing $|r_{(i)(J)}|$ derived using Equation 4 for $x_i$ having a bandwidth of J=0.2n and to calculate an optimal bandwidth $J_{cv}(x_i)$ at each point in the optimal bandwidth calculating unit 34.

Equation 5 means that a value of J corresponding to $\hat{e}_{min}$ among derived most probable errors ê for a plurality of bandwidths J at a specific position $x_i$ becomes the optimal bandwidth $J_{cv}$.

$$\hat{e}(f,J_{cv}|x_i) = \min \hat{e}(f,J|x_i) \qquad \text{[Equation 5]}$$

$J_{cv}(x_i)$ for each position $x_i$ is re-smoothed with a bandwidth of J=0.2n, and then a bandwidth close to $J_{cv}(x_i)$ among the bandwidths initially input by the bandwidth selecting unit 35 is selected as in Equation 6.

$$J_{i1} \leq J_{cv}(x_i) \leq J_{i2} \qquad \text{[Equation 6]}$$

When smoothed most probable values corresponding to $J_{i1}$, $J_{i2}$ which are selected for $x_i$ previously obtained in the final smoothed most probable value calculating unit 36 are $y_{i1}^*$, $y_{i2}^*$, respectively, $y_i^*$ is obtained using the two values by linear interpolation as follows.

$$y_i^* = (y_{i1}^* - y_{i2}^*)/(J_{i1} - J_{i2})(J_{cv}^*(x_i) - J_{i2}) + y_{i2}^* \qquad \text{[Equation 7]}$$

The final smoothed most probable value $y_i^*$ corresponding to $x_i$ reuses the value smoothed with a bandwidth of J=0.5n.

Using such a positioning data filtering algorithm, the real-time stream water depth measurement device using positioning data filtering according to the present invention may filter measured stream water depth data to ensure the reliability of the measured water depth data even when the measured stream water depth data is applied to a small stream having a small basin area and a steep slope.

A real-time stream water depth measurement method using positioning data filtering according to the present invention will be described in detail as follows.

Figure 7:
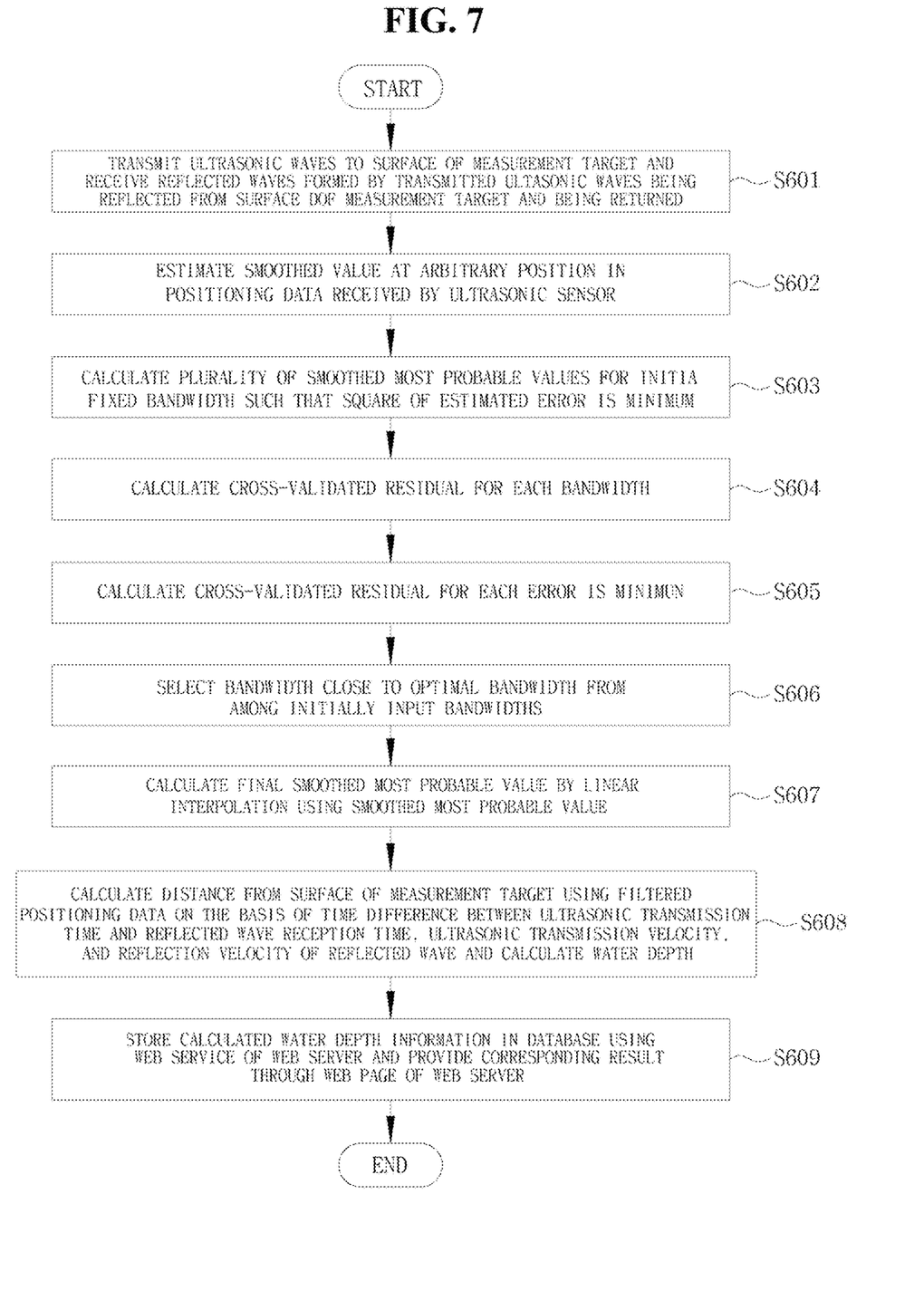
FIG. 7 is a flowchart illustrating a real-time stream water depth measurement method using positioning data filtering according to the present invention.

FIG. 7 is a flowchart illustrating a real-time stream water depth measurement method using positioning data filtering according to the present invention.

First, ultrasonic waves are transmitted to a surface of a measurement target and reflected waves formed by the transmitted ultrasonic waves being reflected from the surface of the measurement target and being returned are received (S601).

Subsequently, a smoothed value at an arbitrary position in positioning data received by an ultrasonic sensor is estimated (S602), a plurality of smoothed most probable values for an initial fixed bandwidth are calculated such that a square of an estimated error is minimum (S603), and a cross-validated residual is calculated for each bandwidth (S604).

Subsequently, an optimal bandwidth is calculated for each point (S605), and a bandwidth close to an optimal bandwidth is selected from among initially input bandwidths (S606).

A final smoothed most probable value is calculated by linear interpolation using the smoothed most probable value (S607).

Subsequently, a distance from a surface of a measurement target is calculated using the filtered positioning data on the basis of a time difference between an ultrasonic transmission time and a reflected wave reception time, an ultrasonic transmission velocity, a reflection velocity of the reflected wave, and the like, and a water depth is calculated (S608).

The calculated water depth information is stored in a database using a Web service of a Web server and the corresponding result is provided through a Web page of the Web server (S609).

The water depth information calculated by filtering may be transmitted to a system controller and a server PC in a wired or wireless manner to be utilized as input data of an automatic discharge measurement program and may be used to check the water depth information in real time using a real-time water depth and discharge display Web service.

The device and the method for measuring the stream water depth in real time using positioning data filtering according to the present invention described above may filter positioning data of a water depth measuring unit using a local linear regression-based bivariate scatterplot smoothing technique through adaptive bandwidth application so that water depth information with increased accuracy may be provided in real time.

Therefore, it is possible to ensure the reliability of the measured water depth data even when the measured stream water depth data is applied to a small stream having a small basin area and a steep slope.

While the present invention has been particularly described with reference to exemplary embodiments, it will be understood by those skilled in the art that various changes in form and details may be made without departing from the spirit and scope of the present invention.

Therefore, the exemplary embodiments should be considered in a descriptive sense only and not for purposes of limitation. The scope of the invention is defined not by the detailed description of the invention but by the appended claims and encompasses all modifications and equivalents that fall within the scope of the appended claims and will be construed as being included in the present invention.

The present invention relates to a device and a method for measuring a stream water depth in real time using positioning data filtering, which filters measured stream water depth data to ensure the reliability of the measured water depth data even when the measurement data for the stream water depth is applied to a small stream having a small basin area and a steep slope.

The invention claimed is:

1. A real-time stream water depth measurement device using positioning data filtering, the real-time stream water depth measurement device comprising:
a measuring unit configured to measure a water depth of a stream to be measured;
a positioning data filtering unit configured to filter water depth data measured by the measuring unit using a local linear regression-based bivariate scatterplot smoothing technique through adaptive bandwidth application; and
a water depth calculating unit configured to calculate the water depth of the stream to be measured using the positioning data, which is filtered by the positioning data filtering unit and in which uncertainty of the water depth measurement is minimized,
wherein the positioning data filtering unit includes:
a smoothed value estimating unit configured to estimate a smoothed value at an arbitrary position in the measured positioning data;
a smoothed most probable value calculating unit configured to calculate a plurality of smoothed most probable values for an initial fixed bandwidth such that a square of an estimated error is minimum;
a cross-validated residual calculating unit configured to calculate a cross-validated residual for each bandwidth;
an optimal bandwidth calculating unit configured to calculate an optimal bandwidth for each point;
a bandwidth selecting unit configured to select a bandwidth close to an optimal bandwidth from among initially input bandwidths; and
a final smoothed most probable value calculating unit configured to calculate a final smoothed most probable value by linear interpolation using the smoothed most probable value.

2. The real-time stream water depth measurement device of claim 1, wherein the measuring unit is an ultrasonic sensor which transmits ultrasonic waves to a surface of a measurement target, receives reflected waves formed by the transmitted ultrasonic waves being reflected from the surface of the measurement target and being returned, and measures a distance from the surface of the measurement target on the basis of a time difference between an ultrasonic transmission time and a reflected wave reception time, an ultrasonic transmission velocity, and a reflection velocity of the reflected wave.

3. The real-time stream water depth measurement device according to claim 1, further comprising a communication unit configured to transmit the calculated water depth information calculated by the water depth calculating unit to a stream information management server that comprehensively manages stream information.

4. The real-time stream water depth measurement device according to claim 1, further comprising a Web server configured to receive the calculated water depth information by the water depth calculating unit through wired and/or wireless communication, store the calculated water depth information in a database using a Web service, and provide the corresponding result through a Web page.

5. A real-time stream water depth measurement device using positioning data filtering, comprising:
a Global Positioning System (GPS) reception unit configured to receive GPS information according to an installation position of the stream water depth measurement device from a GPS satellite;
an ultrasonic sensor unit configured to transmit ultrasonic waves to a surface of a measurement target, receive reflected waves formed by the transmitted ultrasonic waves being reflected from the surface of the measurement target and being returned, and measure a distance from the surface of the measurement target on the basis of a time difference between an ultrasonic transmission time and a reflected wave reception time, an ultrasonic transmission velocity, and a reflection velocity of the reflected wave;
a positioning data filtering unit configured to filter the positioning data of the ultrasonic sensor unit and minimize the uncertainty of the water depth measurement due to rough water surface ripples of a small stream; and a water depth calculating unit configured to calculate a water depth, which is a distance from a bottom of the measurement target to the water surface of the measurement target, using altitude information included in the GPS information received from the GPS reception unit, distance information filtered by the positioning data filtering unit and measured by the ultrasonic sensor unit, and distance information between a structure and the bottom of the measurement target, wherein the positioning data filtering unit includes:
a smoothed value estimating unit configured to estimate a smoothed value at an arbitrary position in the measured positioning data;
a smoothed most probable value calculating unit configured to calculate a plurality of smoothed most probable values for an initial fixed bandwidth such that a square of an estimated error is minimum;
a cross-validated residual calculating unit configured to calculate a cross-validated residual for each bandwidth;
an optimal bandwidth calculating unit configured to calculate an optimal bandwidth for each point;
a bandwidth selecting unit configured to select a bandwidth close to an optimal bandwidth from among initially input bandwidths; and
a final smoothed most probable value calculating unit configured to calculate a final smoothed most probable value by linear interpolation using the smoothed most probable value.

6. The real-time stream water depth measurement device according to claim 5, further comprising a Web server configured to receive the calculated water depth information by the water depth calculating unit through wired and/or wireless communication, store the calculated water depth information in a database using a Web service, and provide the corresponding result through a Web page.

7. The real-time stream water depth measurement device of claim 5, wherein;
the GPS information received by the GPS reception unit includes position information composed of latitude and longitude coordinates values, altitude information representing an altitude, and time information composed of date and time; and
the GPS reception unit receives position information about a position at which the stream water depth measurement device is installed and provides the position information about the corresponding position when the water depth information of the measurement target is provided at the corresponding position.

8. The real-time stream water depth measurement device according to claim 5, further comprising a communication unit configured to transmit the calculated water depth information calculated by the water depth calculating unit to a stream information management server that comprehensively manages stream information.

9. A real-time stream water depth measurement method using positioning data filtering, the real-time stream water depth measurement method comprising:
transmitting ultrasonic waves to a surface of a measurement target and receiving reflected waves formed by the transmitted ultrasonic waves being reflected from the surface of the measurement target and returned;
estimating a smoothed value at an arbitrary position to filter the positioning data received by the ultrasonic sensor, calculating a plurality of smoothed most probable values for an initial fixed bandwidth such that a square of an estimated error is minimum, and calculating a cross-validated residual for each bandwidth;
calculating an optimal bandwidth for each point and selecting a bandwidth close to the optimal bandwidth from among initially input bandwidths;
calculating a final smoothed most probable value by linear interpolation using the smoothed most probable value; and
calculating a distance from the surface of the measurement target using the filtered positioning data on the basis of a time difference between an ultrasonic transmission time and a reflected wave reception time, an ultrasonic transmission velocity, and a reflection velocity of the reflected wave and calculating a water depth.

10. The real-time stream water depth measurement method of claim 9, further comprising transmitting water depth information calculated in the calculating of the water depth to a system controller and a server PC in a wired or wireless manner to be utilized as input data of an automatic discharge measurement program, and checking the water depth information in real time using a real-time water depth and discharge display Web service.

11. The real-time stream water depth measurement method of claim 9, wherein, in order to estimate a smoothed value at an arbitrary position for filtering the positioning data,
$\hat{f}(x_i)$, which is a smoothed value at an arbitrary position $x_i$ in scatterplots, is estimated by local regression using a least-squares method using an equation, $\hat{E}[Y|x_i]=\alpha+\beta x_j$, $x_j \in N_i$,
here, N denotes a local bandwidth around $x_i$ and is optimized for each position, and
when a specific bandwidth J is given and the number of parameters in the bandwidth is N, a local linear regression tracker is obtained using an equation, $\hat{y}_k=\hat{\alpha}+\hat{\beta}x_k$, k=1, . . . , N,
here, $\hat{\alpha}$ and $\hat{\beta}$ may be obtained by linear regression of local data which is present in $i_{-J/2}, \ldots, i_{+J/2}$, and $\hat{y}_{i'}$ becomes a smoothed most probable value corresponding to the position of $x_i$.

12. The real-time stream water depth measurement method of claim 11, wherein, in order to calculate a smoothed most probable value that is linked to a locally adaptive bandwidth, when an observation value of y=f(x) and a bandwidth of J(x) at the x position are given, J(x) and f(x) are calculated such that the square of an estimation error is minimized, using an equation, $e^2(f,J)=E[Y-f(X|J(x))]^2$.

13. The real-time stream water depth measurement method of claim 12, wherein, in order to minimize, when the number of pieces of whole data is n, a plurality of smoothed most probable values f(x) are calculated for initial fixed bandwidths J of various sizes between 0<j<n, and a cross-validated residual is calculated for each bandwidth J by a cross-validated residual calculating unit using an equation, $$r_{(i)(J)} = [y_i - \hat{f}(x_i | J)] / \left(1 - \frac{1}{J} - \frac{(x_i - \bar{x}_J)^2}{V_J}\right),$$

such that the square of an estimation error is minimized, wherein equations, $$V_J = \frac{1}{n} \sum_{j=i-J/2}^{i+J/2} (x_i - \bar{x}_J)^2, \bar{x}_J = \frac{1}{J} \sum_{j=i-J/2}^{i+J/2} x_i$$

are satisfied.

14. The real-time stream water depth measurement method of claim 13, wherein, in order to derive $\hat{e}(f,J|x_i)$ as a result of smoothing $|r_{(i)(J)}|$ for $x_i$ having a bandwidth of $J=0.2n$ and to calculate an optimal bandwidth $J_{cv}(x_i)$ at each point, the optimal bandwidth calculated using an equation, $\hat{e}(f, J_{cv}|x_i) = \min \hat{e}(f,J|x_i)$, and a value of J corresponding to $\hat{e}_{min}$ among derived most probable errors $\hat{e}$ for the plurality of bandwidths J in a specific position $x_i$ becomes the optimal bandwidth $J_{cv}$.

15. The real-time stream water depth measurement method of claim 14, wherein $J_{cv}(x_i)$ for each is re-smoothed with the bandwidth of $J=0.2n$, and then a bandwidth close to $J_{cv}(x_i)$ among the bandwidths initially input by a bandwidth selecting unit is selected using an equation, $J_{i1} \leq J_{cv}(x_i) \leq J_{i2}$, when smoothed most probable values corresponding to $J_{i1}$, $J_{i2}$ which are selected for the obtained $x_i$ are $y_{i1}^*$, $y_{i2}^*$, respectively, $y_i^*$ is obtained using the two values by linear interpolation using an equation, $y_i^* = (y_{i1}^* - y_{i2}^*)/(J_{i1} - J_{i2})(J_{cv}^*(x_i) - J_{i2}) + y_{i2}^*$, and the final smoothed most probable value, $y_i^*$, corresponding to $x_i$ reuses the value smoothed with a bandwidth of $J=0.5n$.

* * * * *